INVENTORS
Edward E.Castor
Claude R. Nielon
Michael A.Walker &
William W.Word,Jr.

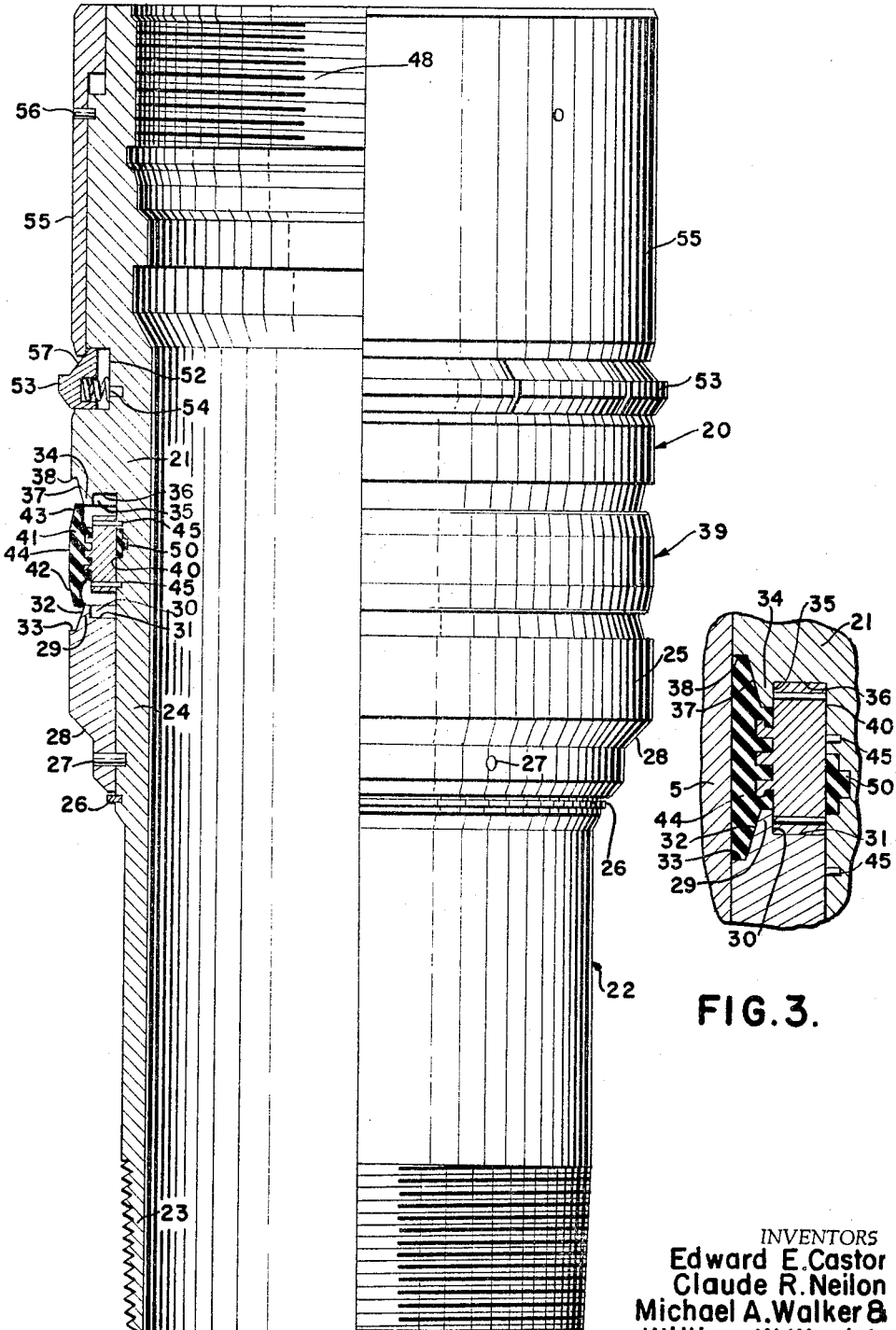

INVENTORS
Edward E. Castor
Claude R. Nielon
Michael A. Walker &
William W. Word, Jr.
BY Arnold, Roylance + Harris
ATTORNEYS United States Patent Office 3,268,241
Patented August 23, 1966

3,268,241
SEAL DEVICES AND WELLHEAD MEMBERS
EMBODYING THE SAME
Edward E. Castor, Claude R. Neilon, Michael A. Walker, and William W. Word, Jr., Houston, Tex., assignors to Armco Steel Corporation, Middletown, Ohio, a corporation of Ohio
Filed Aug. 19, 1963, Ser. No. 302,994
15 Claims. (Cl. 285—139)

This invention relates to devices for establishing a fluid-tight seal between two telescopically related members, and to wellhead members embodying such devices.

With the advent of offshore drilling, an active need has developed for a seal device which can be remotely installed without requiring difficult manipulations. When a well is being drilled from a floating vessel, for example, even operations which are routine on dry land can become impractical. Thus, for example, it is not practical to attempt to stab and make up a threaded joint in an underwater wellhead when the necessary manipulations must be accomplished remotely from a work platform which moves unpredictably as a result of wave action. Accordingly, such conventional seal devices as those which are energized by rotation of a threaded follower member are not really suitable for underwater applications.

Simple lip type pressure energized sealing rings are highly effective for sealing between telescopically related members and, since they require no special manipulative actuation, would appear to be well suited for use in underwater wellhead and like installations. Attempts to use such sealing rings on such devices as mandrels and hanger bodies have met with little success, however, because of the tendency for the rings to be stripped from their retaining grooves accidentally as the device carrying the rings is lowered to its point of installation. Such tendencies are particularly troublesome in underwater installations because the operator has no convenient way of determining whether the sealing ring is still in place and operative once the device which initially carried the sealing ring has been landed at its remote installation point.

A general object of the present invention is to provide an improved seal device which is particularly adapted for use in underwater wellheads and like installations.

Another object is to provide such a device which employs at least one annular sealing element of the pressure energized type, the device being so constructed that the sealing element is not likely to be stripped away accidentally as the device is lowered to its point of installation.

A further object is to devise a seal device which embodies metal elements initially retained in such spaced relation that an associated sealing element can occupy a retracted position in which the sealing element is protected against accidental displacement, the metal elements being weight-actuated, upon landing of the seal device, to support the sealing element in its operative position.

Yet another object is to provide a weight-actuated seal device which, once landed and actuated, is operative as a metal-to-metal load bearing device.

In order that the manner in which these and other objects are achieved in accordance with the invention can be understood in detail, reference is had to the accompanying drawings, which form a part of this specification, and wherein:

FIG. 2 is a view, partly in vertical section and partly in elevation, of a casing hanger constructed in accordance with the invention and employed in the wellhead assembly of FIG. 1;

FIG. 3 is an enlarged fragmentary sectional view of a portion of the device of FIG. 2, showing parts thereof in their actuated positions;

Figure 1:
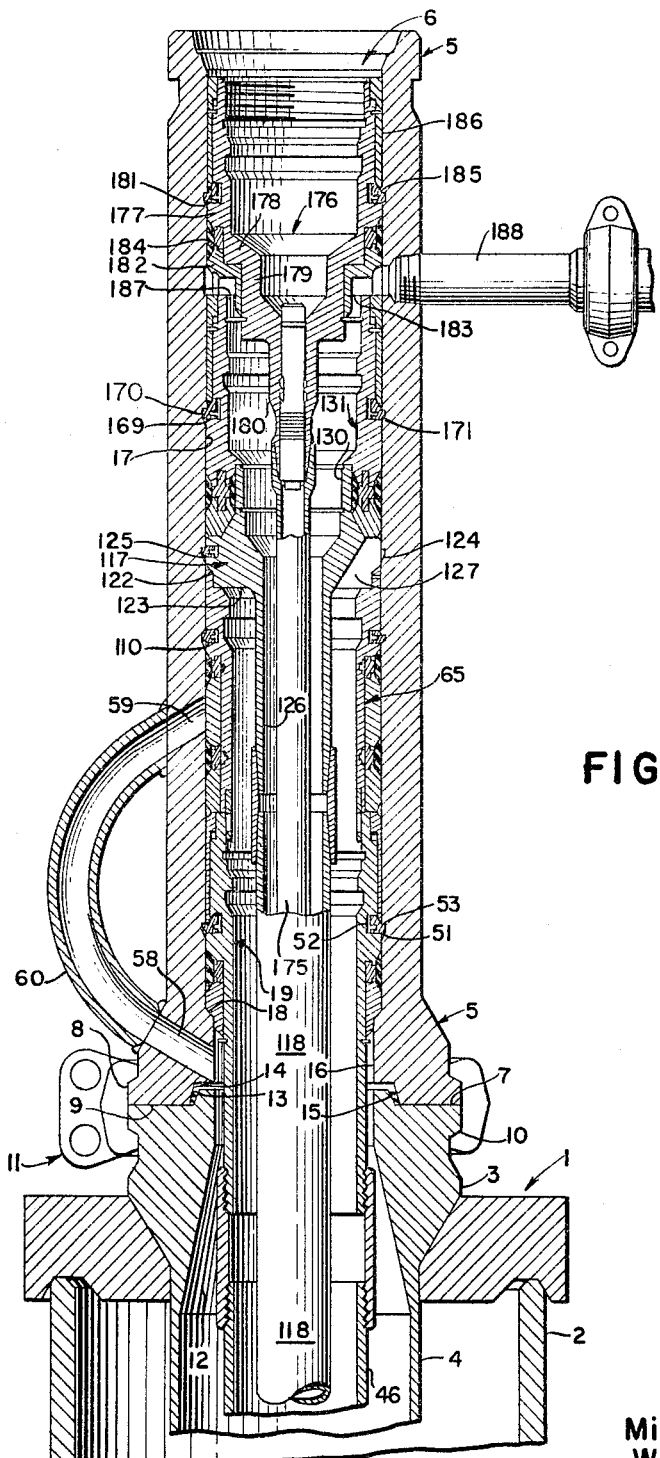
FIG. 1 is a vertical sectional view of an underwater wellhead employing various seal devices constructed in accordance with the invention.

Referring now to the drawings in detail, FIG. 1 illustrates a remotely installed underwater wellhead assembly wherein the internal wellhead members are sealed by seal devices constructed in accordance with various embodiments of the present invention. The assembly includes a base structure comprising a landing plate 1 seated on outer casing 2 and rigidly carrying a stub body 3 from the conductor casing 4 depends.

Seated on the base structure and rigidly clamped and sealed to body 3 is an elongated upright body member 5 having an upright passage indicated generally at 6. Body 3 has a flat transverse annular upper end face 7 and a peripheral flange 8. The lower end of body member 5 has a flat transverse annular face 9, which directly engages face 7, and a peripheral flange 10. Body member 5 is secured by a conventional ring clamp 11 engaging flanges 8 and 10. Body 3 has a central passage 12 with which passage 6 is aligned, passage 12 being surrounded by an annular projection defined by the wall of the passage and a downwardly and outwardly slanting frustoconical surface 13. At its lower end, body member 5 has a downwardly opening recess defined by a downwardly and outwardly slanting surface 14 which is slightly larger than and concentric with surface 13, surfaces 13 and 14 converging downwardly. A metal sealing ring 15 of such trapezoidal cross-section as to be wedged between surfaces 13 and 14 under the axial clamping force applied by clamp 11, is disposed between the two frusto-conical surfaces.

Passage 6 is cylindrical and includes a short lower portion 16 and an elongated upper portion 17, portion 17 being of slightly larger diameter than is portion 16. The two passage portions are joined by a transverse annular upwardly directed shoulder 18 which serves as a seat for rigidly supporting the casing hanger 19 against downward movement.

Casing hanger 19 comprises a tubular mandrel body 20 having an intermediate, larger diameter portion 21, dimensional to fill passage portion 17, and an elongated dependent portion 22 including an exteriorly threaded lower end 23 of smaller outer diameter and a portion 24 of intermediate outer diameter, all of portion 22 being dimensioned to pass freely into passage portion 16 with a substantial annular space being left between the wall of passage portion 16 and mandrel body portion 22. A metal ring 25 slidably embraces the right cylindrical outer surface of portion 24, being retained generally in place by a snap ring 26 and held initially, in a lower position, by shear pins 27 which project inwardly to engage in an outwardly opening transverse annular groove in mandrel body portion 24. The main body of ring 25 presents an outer cylindrical surface of such diameter as to substantially fill passage portion 17, and terminates at its lower end in a transverse annular downwardly and inwardly slanting frusto-conical shoulder 28 adapted to come into flush engagement with shoulder 18 as the hanger is landed. Below shoulder 28, ring 25 is dimensioned to fit slidably within passage portion 16.

The upper end portion of ring 25 includes an upwardly extending annular projection 29 defined by an inner cylindrical surface 30, a flat transverse annular end face 31, and a downwardly and outwardly slanting frusto-conical outer surface 32, the root of surface 32 being spaced inwardly from the outer surface of the main body of the ring so that an upwardly directed transverse annular shoulder 33 surrounds the base of the projection. The lower end portion of mandrel body part 21 is similarly formed with a downwardly extending projection 34 of the same dimensions and configuration as projection 29 but arranged in opposition thereto. Thus, projection 34 includes inner cylindrical surface 35, end face 36 and outer frusto-conical surface 37, the latter terminating at transverse annular shoulder 38. With the parts assembled as seen in FIG. 2, the frusto-conical surfaces 32 and 37 taper inwardly toward each other in converging fashion.

With shear pins 27 in place, ring 25 is disposed with projection 29 spaced a substantial distance below projection 34, so as to accommodate the weight-actuated, pressure-energized seal indicated generally at 39. The seal includes a metal ring 40 which slidably embraces the outer surface of intermediate portion 24 of the mandrel body, the upper and lower ends of ring 40 being dimensioned to be received within the annular spaces enclosed by projections 29 and 34. Securely affixed to the outer surface of ring 40, as by being molded directly thereon, is a flexible lip-type annular gasket 41 of synthetic rubber or like material. Gasket 41 includes a downwardly projecting lip 42 and an upwardly projecting lip 43.

Assuming ring 25 to be retained by shear pins 27 in the position seen in FIG. 2, surfaces 32 and 33 are spaced apart by such a distance as not to distort lips 42, 43, so that the lips of the gasket can assume their normal or relaxed positions. Under these circumstances, the lips 42, 43 slant inwardly, with the outer surface 44 of the central portion of the gasket having essentially the same diameter as the outer surfaces of ring 25 and mandrel portion 21, so that, as the hanger descends toward seat 18, the gasket will not be stripped off. In this connection, it is to be noted that shear pins 45 retain body ring 40 in centered position between ring 25 and mandrel body portion 21.

To install the hanger and suspend the surface casing 46, a handling string is connected to the hanger, as by a suitable handling tool (not shown) engaged with interior threads 48, and the handling string is manipulated to lower the casing string and hanger until shoulder 28 engages shoulder 18. Further downward movement, resulting from the weight of the casing string, ruptures shear pins 27 and 45, causing relative telescopic movement between ring 25 and seal 39, on the one hand, and the mandrel body 20, on the other, until complete metal-to-metal contact is established between body portion 21, ring 40 and ring 25. As a result, the surface casing string is suspended from shoulder 18 via only metal parts of the hanger. As mandrel body 20 is forced downwardly, the axial spacing between ring 25, ring 40 and body portion 21 is eliminated, so that surfaces 32 and 37 move under gasket lips 42, 43, respectively, the tapered form of the surfaces 32, 37 causing the lips to be forced outwardly into uniform engagement with the adjacent wall of passage portion 17, as seen in FIG. 3. As seen in FIG. 3, the lips 42 and 43 thus completely overlap surfaces 32 and 37, respectively, and the extreme edges of the lips respectively engage shoulders 33 and 38. With the lips of the gasket so disposed, a pressure differential axially across the seal will cause the gasket to be pressure energized into good sealing engagement with the surrounding wall of the passage.

In a location always surrounded by metal ring 40, mandrel body portion 24 is provided with an outwardly opening transverse annular groove in which is disposed a suitable pressure energized packing ring 50 which serves to establish a fluid-tight seal between ring 40 and the mandrel body.

At an appropriate distance above shoulder 18, body member 5 is provided with a transverse annular inwardly opening groove 51. Mandrel body portion 21 is provided with an outwardly opening groove 52 slidably accommodating a plurality of arcuate locking segments 53 each urged outwardly by springs 54, FIG. 2. When the hanger 19 is fully landed, with shoulders 18 and 28 in engagement and ring 25, ring 40 and mandrel body portion 21 in mutual engagement, groove 52 opens toward groove 51, so that segments 53 can snap outwardly, engaging in groove 51 and locking the hanger against movement upwardly away from shoulder 18. As fully disclosed in copending application Serial Number 302,836, filed concurrently herewith by Robert Bishop, Edward E. Castor, Michael A. Walker and William W. Word, Jr., a sleeve 55, normally held in inactive raised position by shear pins 56, is provided to accomplish retraction of segments 53, for retrieval of the hanger, when the sleeve is forced downwardly by a suitable tool into camming engagement with downwardly and outwardly slanting faces 57 of the segments.

At the bottom of body member 5, mandrel body portion 22 is spaced a material distance inwardly from the wall of passage portion 16, so that the annulus about the surface casing string 46 is in direct communication with the interior of body member 5 below the casing hanger. In the area just below shoulder 18, body member 5 is provided with a plurality of ports 58 which are spaced in a circular series and each slant upwardly and outwardly from passage portion 16. In an area above the position assumed by the top of hanger 19 when the hanger is fully landed, body member 5 is provided with a plurality of ports 59 each slanting downwardly and outwardly from passage portion 17, the number of ports 59 being equal to the number of ports 58 and respective ones of the ports 58 and 59 being aligned vertically with each other. Each port 58 is connected to the corresponding one of ports 59 by an arcuate conduit 60 which is welded at its ends to the outer surface of the body member. Thus, ports 58 and 59 and conduits 60 serve to complete by-pass flow ducts which extend wholly outside of passage 6 and provide free communication between the annular space surrounding the surface casing string below hanger 19 and the annular space surrounding the handling string 49 above the hanger. The exterior by-pass flow ducts freely pass the return flow during cementing of the surface casing string without interfering in any way with the functions of the casing hanger and despite the fact that there is a full and direct seal between the casing hanger and the wall of passage portion 17.

After the surface casing string has been cemented, the handling joint is manipulated to break the threaded connection between handling tool and the casing hanger 19, and the handling string and tool are withdrawn. To simplify breaking this connection, the threads at 48 are left-handed threads and a suitable stop (not shown) is provided to prevent rotation of the casing hanger. Assembly of the internal elements of the wellhead is now continued.

Figure 4:
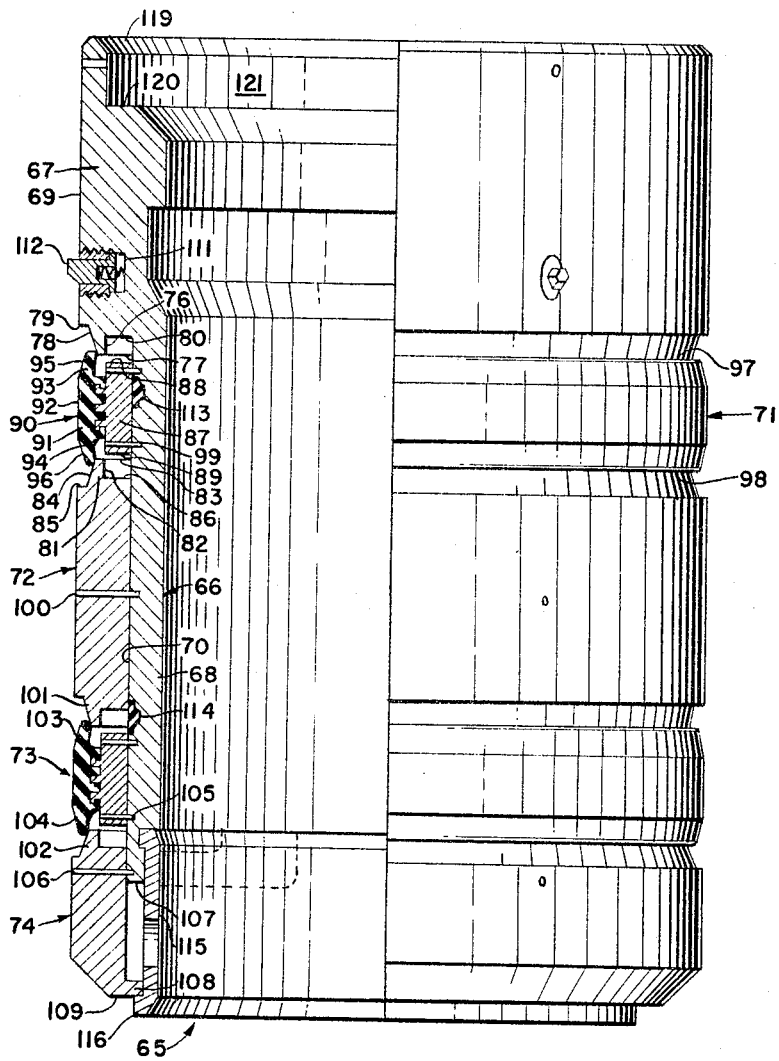
FIG. 4 is a view, partly in vertical section and partly in elevation, of a seal sleeve constructed in accordance with the invention and employed in the wellhead assembly of FIG. 1.

Employing a suitable handling tool (not shown), the sealing device 65, shown in detail in FIG. 4, is landed and actuated to the condition seen in FIG. 1. Referring to FIG. 4, it will be seen that the sealing device 65 comprises a main tubular body 66 having an upper portion 67 and a dependent elongated lower portion 68. Portion 67 has an outer right cylindrical surface 69 of such diameter that the upper body portion substantially fills passage portion 17. Lower body portion 68 presents a right cylindrical outer surface 70 of substantially smaller diameter than is surface 69. Slidably embracing lower body portion 68 are an upper seal ring, indicated generally at 71, an intermediate metal ring 72, a lower seal ring, indicated generally at 73, and a lower metal ring 74.

At its lower end, body portion 67 is provided with a downwardly extending annular projection 75 defined by an inner cylindrical surface 76, a flat transverse annular end face 77, and a downwardly and inwardly slanting frusto-conical outer surface 78, the root of projection 75 being spaced inwardly from surface 69 so that a transverse annular shoulder 79 is presented at the upper edge of surface 78. Projection 75 is spaced outwardly from surface 70, so that there is an intervening flat annular transverse surface 80 at the upper edge of surface 76.

At its upper end, ring 72 is formed with an upwardly extending annular projection 81 defined by cylindrical inner face 82, flat transverse end face 83, and upwardly and inwardly slanting frusto-conical outer surface 84, shoulder 85 being presented at the base of surface 84 and transverse annular surface 86 extending inwardly from the bottom edge of surface 82. Projections 75 and 81 have the same dimensions but are opposed to each other. Thus, for example, cylindrical surfaces 76 and 82 have the same diameter and are coaxial.

Seal ring 71 includes an inner metal ring 87, the inner surface of which embraces surface 70 and the upper and lower ends of which are dimensioned to be received within the spaces surrounded by surfaces 76 and 82, respectively. Thus, upper face 88 of ring 87 can come into direct flush engagement with the surface 80, and lower face 89 can come into flush engagement with surface 86. The outer face of ring 87, suitably interrupted by grooves as shown, is of substantially smaller diameter than surface 69. Sealing element 90, of synthetic rubber or the like, has a main body 91 which is molded directly on metal ring 87 and which presents an outer surface 92 of essentially the same diameter as surface 69. Resiliently flexible lips 93 and 94 extend respectively upwardly and downwardly from body 91, each lip normally tapering toward the corresponding one of surfaces 78 and 84 when the sealing element is relaxed. Thus, in relaxed condition, lip 93 presents an upwardly and inwardly tapering outer surface 96. The inner surfaces of lips 93 and 94 slant at small angles toward surfaces 78 and 84, respectively.

Ring 87 and ring 72 are initially retained, by shear pins 99 and 100, respectively, in positions on body portion 68 such that seal ring 71 is spaced downwardly from body portion 67, with seal lip 93 held out of engagement with surface 78, and ring 72 is spaced downwardly from seal ring 71, with lip 94 held out of engagement with surface 84.

At its lower end, ring 72 has a downwardly extending annular projection 101 which is identical with projection 75. Ring 74 has, at its upper end, an upwardly extending annular projection 102 identical with projection 81. Seal ring 73 is identical with seal ring 71, presenting lips 103 and 104. Seal ring 73 and metal ring 74 are initially retained on body portion 68, by shear pins 105 and 106, respectively, in axially spaced positions such that lip 103 is held out of contact with projection 101 and lip 104 is held out of contact with projection 102, as shown.

Ring 74 depends cylindrically below the end face 107 of body portion 68 and terminates in an inwardly projecting annular flange 108 which presents a flat, transverse, annular end face 109 dimensioned to engage the upper end face of body 20 of casing hanger 19 in the manner seen in FIG. 1.

Above ports 59, body member 5 is provided with an inwardly opening transverse annular groove 110. Body portion 67 of sealing device 65 has a plurality of outwardly opening recesses 111 spaced in a transversely extending circular series, each recess 111 retaining an outwardly spring-biased shear pin 112 constructed in accordance with copending application Serial Number 302,973, filed concurrently herewith by Edward E. Castor and Michael A. Walker. The axial disposition of recess 111 on body 66 is such that, when the sealing device has been lowered to bring face 109 into engagement with the top of the mandrel body 20, and adequate downward force is then applied to body 66 to rupture shear pins 99, 100, 105 and 106 and bring elements 67, 87 and 72, the metal ring of sealing ring 73, and ring 74 all into mutual metal-to-metal contact, the recesses 111 will open toward groove 110 and the shear pins 112 will snap outwardly to engage in groove 110 and latch sealing device against upward movement away from casing hanger mandrel 19. Engagement of the shear pins 112 in groove 110 also serves to maintain the series metal-to-metal engagement between body portion 67, ring 87, ring 72, the metal ring of seal ring 73, ring 74 and the upper end of the body of mandrel 19, the latter being fixed rigidly against downward movement by engagement with shoulder 18.

The specific sealing device of FIG. 4 is particularly advantageous because, since lips 93, 94 and 103, 104 of the sealing elements lie in positions spaced inwardly from surface 69, there is no tendency for the resilient sealing elements of rings 71 and 73 to be stripped away by contact with the wall of passage 6, for example, as the sealing device is lowered into place. By comparing FIGS. 1 and 4, it will be clear that full weight actuation of the sealing device 65, to bring the movable parts thereof into metal-to-metal contact, causes surfaces 78 and 84 to urge lips 93 and 94, respectively, outwardly into contact with the surrounding wall of passage portion 17, so that occurrence of a fluid pressure differential axially across element 91 in either direction will cause pressure energization of the element against the surrounding passage wall to assure a good fluid-tight seal. Similarly, the outer surfaces of projections 101 and 102 urge the respective lips 103 and 104 of the sealing element of ring 73 outwardly into engagement with the surrounding wall of passage portion 17, so that formation of a fluid-tight seal here by pressure energization is assured.

Referring to FIG. 1, it will be seen that, when sealing device 65 has been fully landed and weight-actuated, seal ring 71 is located above ports 59 while seal ring 73 is disposed below ports 59. Accordingly, sealing device 65 serves to seal off the upper ends of the by-pass flow ducts, preventing further fluid flow from the space surrounding surface casing 46.

In locations surrounded respectively by the rings 71 and 73 after sealing device 65 has been weight-actuated, body portion 68 is provided with outwardly opening grooves in which are retained pressure energized sealing rings 113 and 114 which serve to prevent fluid flow axially along surface 70.

Since it may be desirable to recover sealing device 65 from the wellhead, it is necessary to provide means for retaining the movable elements 71, 72, 73 and 74 on body portion 68 after the shear pins have been ruptured. For this purpose, a dependent cylindrical member 115 is provided, the upper edge thereof being connected to the lower end of body portion 68, as by a bayonet joint, and the lower end having an outwardly projecting flange 116 engaged beneath surface 109 when ring 74 is in its initial position.

At its upper end, body portion 67 presents shoulder means on which the mandrel 117 for suspending the intermediate casing string 118 is landed. This shouder means includes an upper, downwardly and inwardly slanting frusto-conical surface 119 and a lower, flat, transverse annular surface 120, surface 119 and 120 being joined by a cylindrical surface 121. As will be clear from FIG. 1, mandrel 117 has a main body portion provided with a downwardly and inwardly slanting shoulder 122 and a flat bottom face 123 for engagement with shoulders 119 and 120, respectively. Body 5 is provided with a groove 124 disposed above the upper end of sealing device 65, when the latter has been landed, actuated and latched in place. Mandrel 117 has a plurality of outwardly opening recesses disposed to face groove 124 when the mandrel is seated, as shown in FIG. 4, each such recess retaining an outwardly biased shear pin 125 in such fashion that, when the mandrel 117 reaches its proper position, shear pins 125 engage in groove 124 to latch the mandrel against upward movement.

Mandrel 117 includes a centrally disposed dependent tubular portion 126 which is suitably threaded at its lower end for connection to casing string 118. Since portion 126 has the same diameter as the casing string to which it is connected, the main body portion of the mandrel projects laterally from portion 126 and occupies a substantial space at the upper end of the annulus around casing 118. Accordingly, mandrel 117 can be ported to accommodate the return flow which occurs during cementing of casing 118. Thus, a plurality of grooves or notches 127 are cut in the main body of mandrel 117, each groove or notch extending completely through the mandrel body portion so as to place the annulus around casing 118 in direct communication with the space above mandrel 117.

It will be understood that landing of mandrel 117 can be accomplished by means of a suitable handling tool and handling string, not shown, as illustrated and described in copending application Serial Number 302,974, filed concurrently herewith by William W. Word, Jr.

From FIG. 1, it will be noted that the sealing device 65, which effectively closes the by-pass flow ducts defined by ports 58, 59 and conduits 60, acts as a load bearing element, directly supporting mandrel 117 and the weight of casing string 118.

Figure 5:
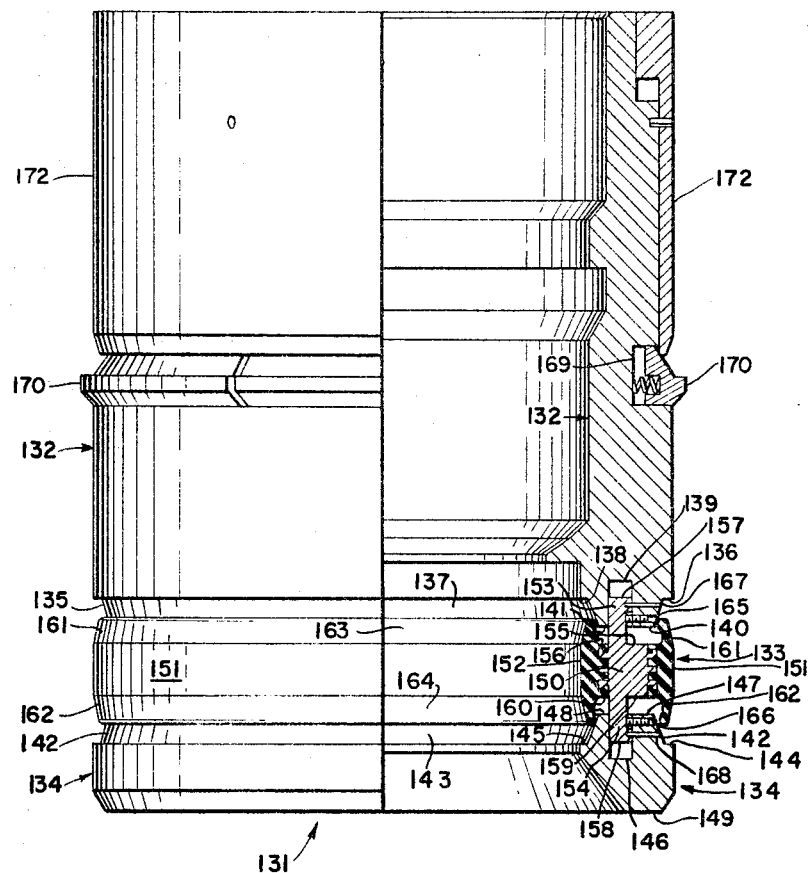
FIG. 5 is a view, partly in vertical section and partly in elevation, of a mandrel sealing device constructed in accordance with the invention and employed in the wellhead assembly of FIG. 1.

With cementing of casing 118 completed, and the handling joint and string removed, assembly of the internal elements of the wellhead is finished as described below. It will be seen that mandrel 117 includes an upwardly projecting tubular portion 130 having a cylindrical outer surface spaced a material distance inwardly from the wall of passage portion 17. A seal device indicated generally at 131, FIG. 5, is inserted downwardly into passage portion 117 until the lower end portion of the sealing device enters the annular space about mandrel portion 130 and engages the upper surface of the main body of the mandrel. Seal device 131 includes a tubular upper body 132, an intermediate sealing ring 133, and a lower ring 134. Body 132 presents, at its lower end, an outer downwardly and inwardly tapering frusto-conical face 135 the upper edge of which is defined by the downwardly directed transverse annular shoulder 136. Body 132 also presents an inner, downwardly and outwardly slanting frusto-conical face 137, the upper edge of which is defined by a transverse annular downwardly directed shoulder 138. A downwardly opening annular groove 139, of rectangular transverse cross-section, is provided in the lower end portion of body 132, being disposed between faces 136 and 138. Groove 139 is substantially narrower than the space between the lower edges of faces 136 and 138, so that the body 132 also presents downwardly directed end face portions 140 and 141.

At its upper end, ring 134 presents a configuration which is completely complementary to that just described for the lower end portion of body 132. Thus, ring 134 has an upwardly and inwardly slanting outer frusto-conical face 142 and an upwardly and outwardly slanting inner frusto-conical face 143. A transverse annular upwardly directed shoulder 144 is provided at the lower edge of face 142 and an inner transverse annular upwardly directed shoulder 145 is provided at the lower edge of face 143. An upwardly opening annular groove 146 is cut into ring 134, groove 146 having the same cross-sectional shape and dimensions as groove 139. Groove 146 divides the upper end face of ring 134 into outer and inner portions 147 and 148, respectively. The bottom end face 149 of ring 134 is so dimensioned as to be disposed for direct flush engagement with the flat upper face of the main body portion of mandrel 117.

Sealing ring 133 includes a rigid supporting annulus 150, an outer resiliently flexible sealing ring 151 and an inner resiliently flexible sealing ring 152. Supporting annulus 150 has an intermediate body portion from which project an upwardly extending annular flange 153 and a downwardly extending flange 154. At the base of flange 163, support 150 presents an outer upwardly directed annular face 155. Flange 153 is dimensioned to project within groove 139 and is of such length, axially that the upper end face 157 of the flange can come into engagement with the corresponding wall of groove 139 simultaneously with engagement of face 155 with face 140. Flange 154 is dimensioned to be received within groove 146 and has a lower end face 158. The main portion of supporting annulus 150 presents, at the base of flange 154, an outer downwardly directed annular face 159. The dimensions of flange 154 are such that faces 158 and 159 can come into simultaneous engagement, respectively, with the bottom wall of groove 146 and face 147.

Formed of synthetic rubber or like resilient flexible material, and molded directly on the outer surface of the main portion of supporting annulus 150, sealing ring 151 includes an upper lip 161 and a lower lip 162. The normal or relaxed condition of ring 151 is such that the lips 161 and 162 slant inwardly respectively toward faces 135 and 142 so that, when the parts of the seal device are related as seen in FIG. 5, the lips 161 and 162 are displaced inwardly from the outer cylindrical surfaces of body 132 and ring 134 and are therefore protected against engagement with any surrounding well element during descent of the seal device toward its final position of installation. Sealing element 152 similarly includes an upper lip 163 and a lower lip 164, the relaxed or normal condition of element 152 being such that the lips slant inwardly respectively toward faces 137 and 143 when the parts of the seal device are in the positions shown in FIG. 5.

Body 132 carries at least one set screw 165 which extends into frictional engagement with the outer surface of flange 153. Ring 134 correspondingly carries at least one set screw 166 extending into engagement with the outer surface of flange 154. Set screws 165 and 166 serve to hold body 132, ring 133 and ring 134 in the relative positions seen in FIG. 5, preparatory to installation of a plurality of shear pins 167 and 168. Shear pins 167 serve to retain the illustrated relative positions between body 132 and ring 133, while shear pins 168 serve to retain the initial relative positions, as seen in FIG. 5, between ring 133 and ring 134.

Body 132 has an outwardly opening transverse annular groove 169 which accommodates an annular series of latching segments 170. Segments 170 are biased outwardly and have the same configuration as the segments 53 with which mandrel 19 is equipped. At a suitable location, an inwardly opening transverse annular groove 171 is provided in the wall of passage 6 of body member 5, to cooperate with segments 170 in the general fashion hereinbefore described. An actuator sleeve 172 embraces the upper end portion of body 132 and can be actuated downwardly to cam the latch segments 170 inwardly, when it is desired to retrieve the seal device 131.

Installation of the seal device 131 can be accomplished with a suitable handling tool and string of handling pipe (not shown), the seal device being inserted downwardly until shoulder 149 engages the upper surface presented by the body of mandrel 117. Further downward movement of the handling string causes shear pins 167 and 168 to be ruptured and body 132 and ring 133 to move downwardly until surfaces 155, 156 and 157 respectively engage surfaces 140, 141 and the corresponding wall of groove 139, and surfaces 158, 159 and 160 respectively engage the corresponding wall of groove 146, and faces 147 and 148. Such relative movement between body 132 and rings 133 and 134 results in direct metal-to-metal engagement between these three elements of the seal device, so that the seal device is now capable, for example, of supporting the weight of additional elements installed thereabove. Further, such relative movement brings faces 135 and 142 respectively beneath the lips 161 and 162 of sealing element 151. Further, faces 137 and 143 come respectively beneath the lips 163 and 164 of sealing element 152. Accordingly, the lips 161 and 162 are distorted outwardly, in the same general fashion hereinbefore discussed with reference to FIG. 3, and accordingly are disposed in direct engagement with the wall of passage 6 of body member 5. Similarly, lips 163 and 164 are distorted inwardly into direct engagement with the cylindrical outer surface presented by portion 130 of mandrel 117. With the lips of the sealing elements 151 and 152 in these positions, both sealing elements are now effective as pressure energized sealing devices upon occurrence of pressure differentials axially across the ring 133.

The relative positions of grooves 169 and 171, with reference to the axial position of mandrel 117 within body member 5, are such that, when the seal device 131 has been seated on mandrel 117 and fully weight-actuated, as just described, the latching segments 170 are disposed to spring outwardly into latching engagement with groove 171. Accordingly, the seal device 131 is now not only effective to accomplish a fluid-tight seal between the wall of passage 6 and the portion 130 of mandrel 117, but is also effectively latched within body member 5 against upward movement.

The tubing string 175 is suspended from a hanger, indicated generally at 176, which is seated on and supported by seal device 131. Hanger 176 includes an upper tubular portion 177, a first intermediate portion 178, a second intermediate portion 179, and a lower portion 180 to which the tubing string is attached in usual fashion. Upper portion 177 is of such diameter as to completely fill the passage of body member 5 immediately below a transverse annular groove 181. Portion 178 presents a cylindrical outer surface of substantially smaller diameter than the surrounding area of passage 6, while portion 179 presents a cylindrical outer surface of still smaller area. The two intermediate portions are embraced by a ported ring 182 having a flat annular bottom surface 183 disposed to seat directly on the upper end face of body 132 of seal device 131. Outwardly of portion 178, the lower end of portion 177 presents surfaces identical to surfaces 35–38 of mandrel 19, FIG. 2. At its upper end, outwardly of portion 178, ring 182 presents surfaces identical with surfaces 30–33 of ring 25, FIG. 2. Disposed between the upper portion 177 of the mandrel and ring 182 is a sealing ring indicated generally at 184 and corresponding identically with the sealing ring 41, FIG. 2. Before installation of mandrel 176, the ring 182 and sealing ring 184 are retained by shear pins in locations spaced downwardly from the lower edge of portion 177, so that the inwardly slanting lips of the resilient sealing element of ring 184 are protected against engagement with surrounding objects as the mandrel approaches its installed position. At the end of insertion of the mandrel into body member 5, surface 183 comes into engagement with seal device 131 and the shear pins retaining ring 182 and sealing ring 184 are ruptured, so that the main body of the mandrel can continue to descend far enough to bring the parts to the positions shown in FIG. 1, while ring 182 remains stationary. Thus, it will be understood that ring 182, the metal body of sealing ring 184, and body portion 177 of the mandrel all come into direct metal-to-metal engagement and that the lips of the resilient sealing element of sealing ring 184 are then supported directly by the corresponding frusto-conical surfaces presented by portion 177 and ring 182. Body 177 has a suitable groove accommodating a plurality of latching segments 185 which engage in groove 181 to restrain the mandrel against upward movement, away from seal device 131. An actuating sleeve 186 surrounds the upper end portion of the mandrel and is provided to actuate the latch segments 185 to their disengaged position, when it is desired to retrieve the mandrel from body member 5, as hereinbefore described in detail with reference to mandrel 19.

Ring 182 includes a plurality of circularly spaced ports 187 which establish communication between the annular space surrounding the tubing string and a lateral flow duct 188, once the mandrel 176 has been installed. In this connection, it will be observed that over a material portion of its length, ring 182 has an outer diameter which is substantially less than the diameter of the surrounding wall of passage 6, so that all of the portions 187 open into a common annular space which communicates directly with the lateral flow line 188.

Elements of the wellhead installed above body member 5 have been ignored in the foregoing description, since the nature of such elements is not pertinent to this invention. In general, however, the blow out preventers and christmas tree are secured to the top of body member 5 by a remotely actuated coupling such as that described and claimed in copending application Serial Number 264,195, filed March 11, 1963 by Claude R. Neilon, Michael A. Walker and William W. Word, Jr. It will be understood that the elements of the base structure, and body member 5, are assembled with the aid of a suitable guide system (not shown) which can be of the type described in U.S. Patent 2,808,229, issued October 1, 1957, to Robert F. Bauer et al., and that the internal components of the wellhead usually are installed via a riser pipe extending from the wellhead to the surface of the body of water in which the installation is being made.

While specific embodiments of the invention have been chosen for illustrative purposes, it will be understood that various changes and modifications can be made therein without departing from the scope of the invention as defined in the appended claims.

We claim:

1. In a seal device for establishing a fluid-tight seal between two telescopically related well members, the combination of
   a first metal member having an upper portion having a cylindrical outer surface and a dependent lower portion of smaller transverse dimension than said upper portion, said first member also including
      a downwardly and inwardly slanting frusto-conical seal-supporting surface, and
      a transverse downwardly facing stop surface;
   a second metal member of annular form surrounding said lower portion of said first member and having
      an upwardly and inwardly slanting frusto-conical seal-supporting surface,
      a transverse upwardly facing stop surface, and
      downwardly directed shoulder means disposed for engagement with a supporting shoulder on the outer one of the two well members;
   releasable means engaged between said lower portion of said first member and said second member and retaining said second member initially in a position in which said seal-supporting surfaces and said stop surfaces are spaced axially apart;
   a seal ring comprising
      an annular metal support embracing said lower portion of said first member and disposed between said stop surfaces, and
      a resiliently flexible sealing element carried by said support and having an upper annular sealing lip projecting from said support toward said downwardly and inwardly slanting surface and a lower annular sealing lip projecting from said support toward said upwardly and inwardly slanting surface; and
   releasable means engaged between said support and said lower portion of said first member and retaining said seal ring initially in a position between said upper portion of said first member and said second member,
      the configuration of said resiliently flexible sealing element when the same is relaxed being such that said upper and lower sealing lips each slant inwardly so as to be protected from engagement with surrounding members during the downward movement required for installation of the seal device, downward movement of said first member relative to said second member after engagement of said second member with a support shoulder being effective first to release said first-mentioned releasable means to allow said support to engage said upwardly facing stop surface, and then to release said second releasable means to allow said support to engage said downwardly facing stop surface, said lips being deformed outwardly into operative sealing positions by the respective ones of said seal-supporting surfaces when said support engages both of said stop surfaces.

2. A device in accordance with claim 1 and wherein said resiliently flexible sealing element is dimensioned to cooperate with the passage wall of a wellhead body member, and said first member is a hanger member, said lower portion thereof being equipped with means for attachment to a string of well pipe.

3. A device in accordance with claim 1 and wherein said resiliently flexible sealing element includes an intermediate portion embracing said support and having an outer cylindrical surface dimensioned for engagement with the outer one of the two telescopically related well members, the outer surfaces of said lips forming extensions of said outer surface of said intermediate portion when said lips are distorted outwardly by said seal-supporting surfaces.

4. A device in accordance with claim 1 and wherein said upper portion of said first member has an outwardly opening recess, the device further comprising a latch element disposed in said recess and biased outwardly for latching engagement with the outer one of the two telescopically related well members.

5. A device in accordance with claim 1 and further comprising annular seal means engaged between said annular metal support and said lower portion of said first member.

6. A device in accordance with claim 5 and wherein said annular seal means is carried by said lower portion of said first member in a location surrounded by said annular metal member both when the latter is initially retained by said first-mentioned releasable means and when said annular metal support is in engagement with said stop surfaces.

7. In a hanger for a string of well pipe, the combination of a tubular body member comprising an upper portion having a cylindrical outer surface, and a lower portion depending from said upper portion and having at least one cylindrical outer surface of smaller diameter than the outer surface of said upper portion, said lower portion being equipped with means for attachment to the string of well pipe to be suspended from the hanger, said upper portion having at its lower end a downwardly facing seal-engaging surface and a downwardly facing abutment;

a metal ring member embracing said lower portion and comprising an upwardly facing seal-engaging surface, an upwardly facing abutment, and downwardly directed transverse annular shoulder means adapted to seat on a supporting wellhead member when the hanger is installed in a wellhead;

first releasable means engaged between said body member and said ring member and initially retaining said ring member in a position in which said upwardly facing abutment is spaced downwardly from said downwardly facing abutment and said seal-engaging surfaces are spaced apart;

a seal ring embracing said lower portion between said upper portion and said ring member and comprising an inner annular metal member having upper and lower faces disposed in respective opposition to said abutments, and an annular distortable sealing element carried by and surrounding said inner annular metal member, said sealing element including an annular portion projecting generally upwardly toward said downwardly facing seal-engaging surface and an annular portion projecting generally downwardly toward said upwardly facing seal-engaging surface; and second releasable means engaged between said inner annular metal member of said seal ring and said body member and initially retaining said seal ring in a position in which said inner annular metal member and said abutments are spaced apart, downward movement of said body member relative to said metal ring member after engagement of said shoulder means with a supporting wellhead member being effective first to release said first releasable means to allow said upwardly facing abutment to engage said inner annular member of said seal ring and then to release said second releasable means to allow said inner annular member of said seal ring to engage said downwardly facing abutment, engagement of said abutments with said inner annular member of said seal ring being accompanied by engagement of said seal-engaging surfaces respectively with said upwardly and downwardly projecting annular portions of said sealing element to distort the same to operative sealing condition.

8. A hanger in accordance with claim 7 and wherein said metal ring member is provided with ports communicating with the space surrounding the string of well pipe suspended from the hanger and opening laterally of said tubular body below said seal ring.

9. A hanger in accordance with claim 7 and wherein downwardly facing seal-engaging surface is a frusto-conical surface which slants downwardly and inwardly, said upwardly facing seal-engaging surface is a frusto-conical surface which slants upwardly and inwardly, and said upwardly projecting and downwardly projecting annular portions of said distortable sealing element are lips which slant inwardly when said sealing element is in normal, undistorted condition and are urged outwardly to operative sealing positions by said frusto-conical seal-engaging surfaces as said abutments and said inner annular member of said seal ring come into engagement.

10. A hanger in accordance with claim 7 and further comprising annular seal means engaged between said inner annular member of said seal ring and said lower portion of said body member.

11. In a seal device of the type described, the combination of a tubular metal member having an upper portion of a given outer diameter, a lower portion of smaller outer diameter than said upper portion, and a downwardly directed abutment face at the juncture of said upper portion and said lower portion;

a lower metal ring embracing said lower portion of said tubular member and having an upwardly directed abutment face;

a second metal ring embracing said lower portion of said tubular member and disposed between said abutment faces;

a distortable annular sealing element embracing and
carried by said second ring and including upper and
lower portions projecting respectively upwardly and
downwardly from said second ring; and releasable means initially securing said lower ring and
said second ring to said lower portion in positions in
which said second ring is spaced from both of said
abutment faces, the ports being so constructed and arranged that
a downward force applied to said tubular member when said lower ring is engaged with an
upwardly facing support is effective to release
said releasable means and allow relative axial
movement between said tubular member, said
lower ring and said second ring to bring said
second ring into engagement with both of said
abutment faces, such relative axial movement causing said upper
portion of said tubular member and said lower
ring to engage said upper and lower portions of
said annular sealing element, respectively, and
distort the same outwardly into operative sealing position.

12. A seal device in accordance with claim 11 and further comprising a third metal ring embracing said lower portion of said tubular member below said lower ring;

a fourth metal ring embracing said lower portion of said tubular member below said third ring, said lower ring having a downwardly directed abutment face and said fourth ring having an upwardly directed abutment face, said third ring being disposed between said abutment faces of said lower and fourth rings;

a distortable annular sealing element embracing and carried by said third ring and including upper and lower portions projecting respectively toward said lower ring and said fourth ring; and releasable means initially retaining said third and fourth rings in positions in which said third ring is spaced from the abutment faces of said lower and fourth rings.

13. In a seal device for sealing between an inner wellhead member and a member surrounding the same, the combination of a tubular body member having a downwardly opening annular groove in its lower end portion, the lower end portion of said body member having a first downwardly directed annular seal-engaging surface disposed outwardly of said groove, and a second downwardly directed annular seal-engaging surface disposed inwardly of said groove;

a lower ring member having downwardly directed means for engaging a supporting wellhead member, the upper end portion of said ring member having an upwardly opening annular groove, a first upwardly directed annular seal-engaging surface disposed outwardly of said upwardly opening groove, and a second upwardly directed annular seal-engaging surface disposed inwardly of said upwardly opening groove;

an intermediate metal ring member having
an intermediate portion, a first annular flange projecting upwardly from said intermediate portion and disposed in said downwardly opening groove, and a second annular flange projecting downwardly from said intermediate portion and disposed in said upwardly opening groove;

a first distortable annular sealing element surrounding and carried by said intermediate portion of said intermediate metal ring member and having upper and lower portions projecting respectively toward said first downwardly directed seal-engaging surface and said first upwardly directed seal-engaging surface;

a second distortable annular sealing element embraced and supported by said intermediate portion of said intermediate metal ring member and having upper and lower portions projecting respectively toward said second downwardly directed seal-engaging surface and said second upwardly directed seal-engaging surface; and releasable means interconnecting said body member, said intermediate member and said lower ring member and maintaining said members out of axial engagement, downward force applied to said body member when said lower ring member is engaged with a supporting wellhead member being effective to release said releasable means and allow further downward movement of said body member to bring said body member, said intermediate ring member and said lower ring member into series axial engagement, such further downward movement causing said first downwardly directed seal-engaging surface and said first upwardly directed seal-engaging surface to respectively engage and distort outwardly to operative positions said upper and lower portions of said first sealing element and said second downwardly directed seal-engaging surface and said second upwardly directed seal-engaging surface to respectively engage and distort inwardly said upper and lower portions of said second sealing element.

14. In a well device adapted to be installed in telescopic relation to at least one other well member and to establish a fluid-tight seal at the telescopically adjacent surface of such other member, the combination of first, second and third coaxial annular components;

said first component being a rigid tubular body having
    a generally axially directed frusto-conical seal engaging surface, and
    a transverse axially directed stop surface facing in the same direction as said seal engaging surface;

said second component being a rigid ring spaced axially from said rigid tubular body and having
    a generally axially directed frusto-conical seal engaging surface opposed to and tapering toward said seal engaging surface of said rigid tubular body,
    a transverse axially directed stop surface opposed to and facing toward said stop surface of said rigid tubular body, and
    a transverse shoulder facing axially away from said rigid tubular body;

said third component being a seal ring disposed between said rigid tubular body and said rigid ring and comprising
    a rigid support ring having oppositely facing axially directed transverse stop surfaces each facing toward and aligned axially with a different one of said stop surface of said rigid tubular body and said stop surface of said first-mentioned rigid ring, and
    an annular distortable sealing element carried by said support ring and including an annular body portion concentric with and secured to said support ring, a first annular axially projecting portion extending from said body portion toward said seal engaging surface of said rigid tubular body, and a second annular axially projecting portion extending from said body portion toward said seal engaging surface of said first-mentioned rigid ring, said frusto-conical seal engaging surfaces tapering in converging fashion toward said seal ring and each extending axially beyond the corresponding one of said stop surfaces of said rigid tubular body and said first-mentioned rigid ring;

rigid tubular means extending axially of the well device at least from said rigid tubular body to said first-mentioned rigid ring, two of said first, second and third components being telescopically carried by said tubular means, and the other of said components being rigidly secured to said tubular means; and releasable means initially securing said two of said components to said tubular means in positions such that said stop surface of said rigid tubular body and said stop surface of said first-mentioned rigid ring are each spaced axially from the corresponding one of said stop surfaces of said support ring, said distortable sealing element occupying a substantially relaxed, undistorted position when said two of said components are secured to said tubular means by said releasable means, in which relaxed position said axially projecting portions respectively overlap said seal engaging surfaces with the peripheral surfaces of said axially projecting portions tapering generally frusto-conically from the body portion of said sealing element toward the respective ones of said seal engaging surfaces, said first component, said second component and said annular body portion of said distortable sealing element all having essentially the same outer diameter when said distortable sealing element occupies said substantially relaxed, undistorted position, the parts being so constructed and arranged that an axial force applied to said rigid tubular body in a direction toward said first-mentioned rigid ring when said shoulder of said first-mentioned rigid ring engages a support is effective to release said releasable means and allow relative axial movement between said two of said components and said tubular means to bring said stop surfaces of said support ring into respective engagement with said stop surfaces of said rigid tubular member and said first-mentioned rigid ring, such relative axial movement causing said seal engaging surfaces to respectively engage said axially projecting portions of said annular sealing element and distort the same into operative sealing positions.

15. In a well device adapted to be installed in upright telescopic relation to a well member and to establish a fluid-tight seal at an adjacent surface of such well member, the combination of two coaxial metal tubular members, one of said members having an axially projecting portion telescopically embraced by the other of said members, each of said members having a transverse frusto-conical seal engaging surface, said seal engaging surfaces being spaced apart axially and tapering toward each other in converging fashion, one of said members having an end portion which is spaced from said seal engaging surfaces and constitutes the upper end of the well device when the same is installed, the other of said members having an end portion which constitutes the lower end of the well device when the same is installed and which is provided with a transverse shoulder for engagement with an upwardly directed supporting shoulder on another well member;

a metal support ring telescopically disposed in a location between said seal engaging surfaces;

an annular distortable sealing element carried by said support ring and comprising an annular body portion concentric with and secured to said support ring, a first annular axially projecting lip portion extending from said body portion toward one of said seal engaging surfaces, and a second annular axially projecting lip portion extending from said body portion toward the other of said seal engaging surfaces;

releasable means initially interconnecting said tubular members to secure them in relative axial positions such that the opposite ends of said seal engaging surfaces are spaced apart by a distance substantially greater than the axial width of said distortable sealing element, said lip portions extending respectively into partial overlapping relation with said seal engaging surfaces, such spacing between said seal engaging surfaces allowing said lip portions to assume normal at least substantially relaxed positions in which said lip portions slant respectively toward said seal engaging surfaces; and axially opposed abutment means for limiting relative axial telescopic movement of said tubular members in a direction tending to decrease the space between said seal engaging surfaces, the parts being so constructed and arranged that an axial force applied downwardly to said upper end of the well device when said shoulder at the lower end thereof is engaged with a support is effective to release said releasable means and cause relative axial movement of said tubular members to bring said abutment means into operative engagement, such relative axial movement causing said frusto-conical seal engaging surfaces to distort said lip portions radially into operative sealing positions.

References Cited by the Examiner

UNITED STATES PATENTS

| | | | |
|---|---|---|---|
| 1,199,029 | 9/1916 | Hovis | 285—2 |
| 1,905,122 | 4/1933 | Baash | 285—139 X |
| 1,909,663 | 5/1933 | Crickmer | 277—235 |
| 2,230,421 | 2/1941 | Works | 285—143 X |
| 2,244,135 | 6/1941 | Wallace | 277—235 X |
| 2,249,171 | 7/1941 | Quintrell | 166—201 |
| 2,467,822 | 4/1949 | Griffin | 285—147 X |
| 2,760,583 | 8/1956 | Kline | 166—201 |
| 3,051,513 | 8/1962 | Watts | 285—146 |
| 3,134,610 | 5/1964 | Musolf | 285—133 X |

CARL W. TOMLIN, *Primary Examiner.*

S. R. MILLER, R. GIANGIORGI, *Assistant Examiners.*